May 12, 1959 A. D. BRUNER 2,886,138
AUTOMATIC TRACTION DEVICE FOR VEHICLES
Filed July 1, 1957 3 Sheets-Sheet 2

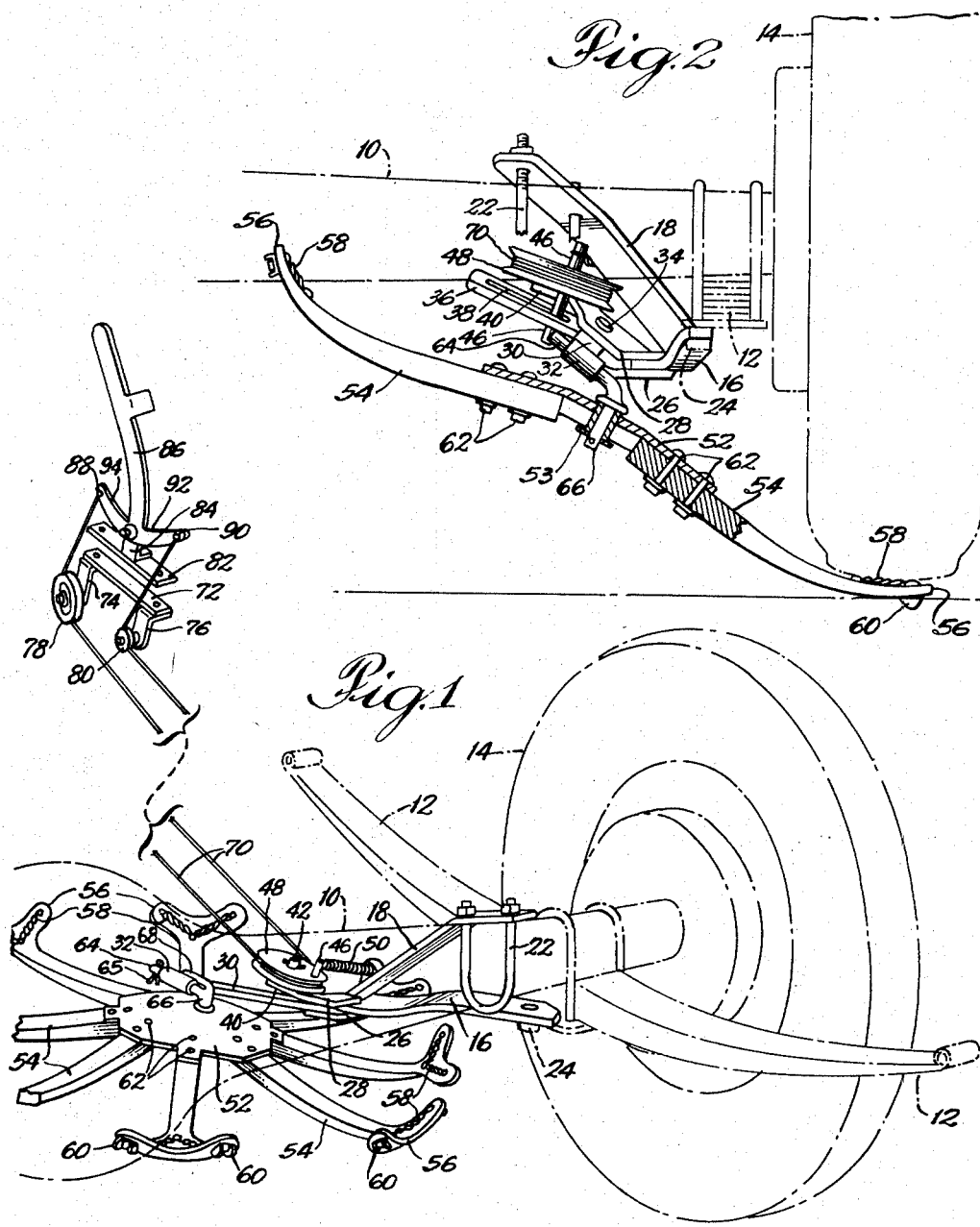

INVENTOR:
Abrom D. Bruner,
BY Bair, Freeman & Malinare
ATTORNEYS.

May 12, 1959  A. D. BRUNER  2,886,138
AUTOMATIC TRACTION DEVICE FOR VEHICLES
Filed July 1, 1957  3 Sheets-Sheet 3
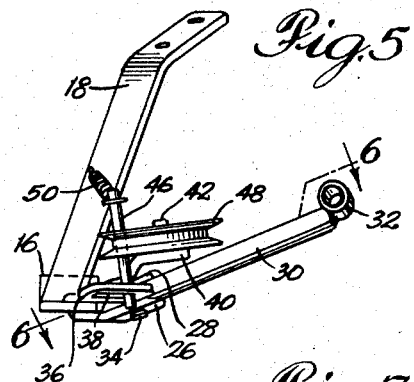
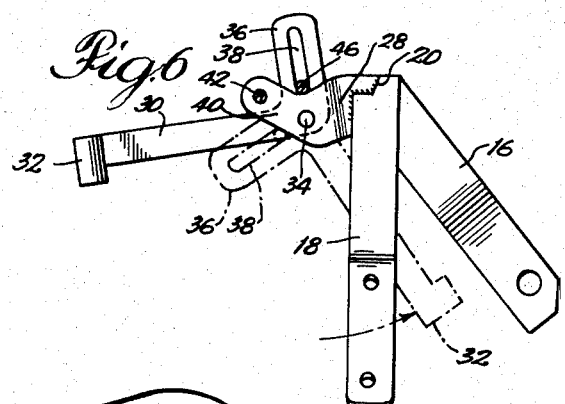
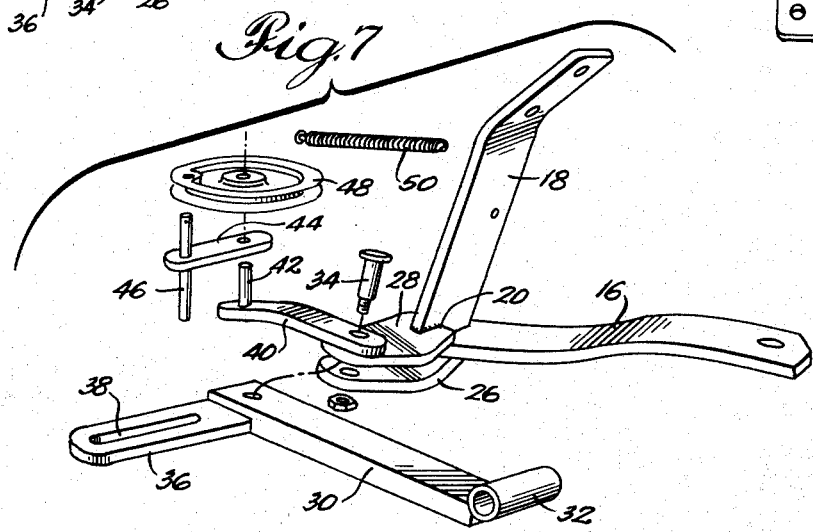
INVENTOR:
Abrom D. Bruner,
BY Bair, Freeman & Malinari
ATTORNEYS.

United States Patent Office 2,886,138
Patented May 12, 1959

2,886,138

AUTOMATIC TRACTION DEVICE FOR VEHICLES

Abrom D. Bruner, Sioux City, Iowa

Application July 1, 1957, Serial No. 669,189

4 Claims. (Cl. 188—4)

This invention relates to an anti-skid or traction device for automotive vehicles. It is now the practice to equip an automobile with skid chains which encircle the wheel in order to provide traction when the roads are covered with ice and snow. These chains have many disadvantages. They are difficult to put on and remove from the tires since the car must be jacked up. Usually they are needed only for a short portion of the trip where the snow is deep, and when the car gets out onto the highway which has been cleared of snow, the chains clatter and make it necessary to reduce the speed of the car. Furthermore, when the chains are run for more than a short distance on dry pavement, the links begin to break and beat against the fender with every revolution of the wheel. The only alternative the motorist has is to remove the chains when he gets out on the highway, which, of course, is impractical.

The present invention is directed to a traction device which is completely operable from the driver's compartment of the vehicle. Traction may be provided when desired merely by flipping a lever within the reach of the driver and when traction is no longer necessary the traction elements may be retracted to elevated position in the same manner. The device consists of a series of radial legs extending from a central rotatable hub, like an octopus, the legs terminating in ground gripping feet which are adapted to be interposed between the tread of the tire and the surface of the road. The device rotates as the tire revolves to provide a ground gripping surface in advance of the tire. One leg after the other is fed under the tread causing the device to turn like a merry-go-round. Devices of this type have been suggested previously but as far as I know none have been commercially successful. In one of the prior forms the rotating legs which are interposed between the tire tread and the road surface comprise chains secured to a central hub. The chains have no rigidity since they consist of a plurality of interconnected links. Sometimes they are thrown under the wheel and sometimes against the side of the wheel. Usually only a segment of the length of chain intended for traction is laid beneath the tread. In another previously proposed form a metal disc having flat radial fingers cut in the edge thereof was mounted on a retractable arm adjacent the wheel. Because the fingers were integral with the disc and not capable of being distorted without permanent deformation, they quickly became deformed so that they no longer ran in the proper plane for producing traction. The reason is that the vehicle to which the disc is attached is moving forward continuously. The particular finger or fingers that happen to be in gripping contact with the road at any one time are stationary, being held against the road by the weight imposed by the wheel. Such finger remains stationary until the wheel passes over, but meanwhile the disc moves forward with the vehicle. Thus, we have a distorting force exerted on the finger or similar element.

A primary object of the present invention is to provide a traction device of this type having legs which will withstand such distortion and which terminate in flexible road and tire gripping feet.

Another object is to provide a novel mounting means for said rotatable traction device which will bring the device closer toward the underside of the vehicle in retracted position, to maintain the road clearance of the vehicle.

Another object is to provide a retracting device which locks in retracted position and which is operable from the driver's compartment of the vehicle.

A further object is to provide a novel mounting for the hub which prevents the hub or disc about which the legs rotate from twisting when the device is in operative position and which permits the disc to assume a horizontal position when the supporting arm is retracted to insure elevation of all the radial legs at a predetermined distance above the road.

A further object of the invention is to provide a traction device of this type which does not rattle when retracted against the vehicle.

These and other objects will become apparent from the following description when read in conjunction with the accompanying drawings, wherein:

Figure 1 is a perspective view showing the device of the invention mounted adjacent the right rear wheel of a vehicle;

Figure 2 is a rear elevational view of the device shown in Figure 1 with the traction legs oriented in operative position;

Figure 5 is a front elevational view of the bracket for securing the device to the vehicle, and the retracting means assembled therewith;

Figure 6 is a sectional view taken along the line 6—6 of Figure 5. The retractable arm 30 is shown in operative position in broken lines and in retracted position in solid lines.

Figure 7 is an exploded perspective view of the mounting assembly for securing the device to the vehicle and causing it to be moved from operative to retracted position.

Figure 3:
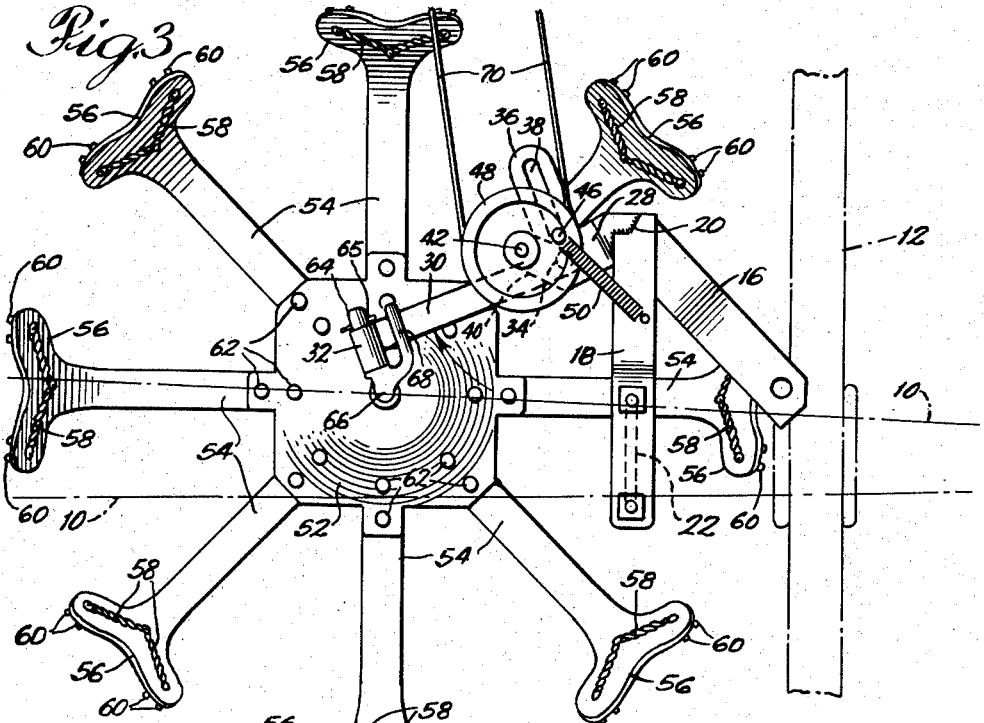
Figure 3 is a plan view of the device of the invention showing the traction legs in retracted position.

Referring now to Figure 1 of the drawings, the axle of the vehicle is represented by the numeral 10. The vehicle spring 12 is secured to the axle in the conventional manner and the wheel 14 is mounted on the end of the axle. In Figure 1 the right rear wheel is illustrated. The device of the invention consists of a central hub or disc 52 having a plurality of flexible legs 54 terminating in ground gripping feet 56. The legs rotate about the shaft 66 when in operative position shown in Figure 2. The disc 52 is mounted on a retractable arm 30 which in turn is pivotally mounted on a bracket fixed to the underside of the vehicle in any suitable manner. Pulley means 48 is provided for rotating the arm 30 through an arc toward the ground and the wheel in one direction, and toward the underside of the vehicle in the other direction. The pulley is operated by means of a flexible cable 70 which attaches to an operating lever 86 mounted inside the vehicle adjacent to the driver. It is intended that one of these devices be mounted adjacent each rear wheel. However, since the construction of each traction device is identical, the drawings illustrate only one device and one cooperating wheel of the vehicle.

The mounting bracket consists of a horizontal arm 16 and an angular arm 18 which intersect and are welded, as indicated at 20, see Figure 6. The arms extend forwardly of the axle 10. U-bolt 22 encircles the axle and is adapted to secure the upper arm 18 thereto. The lower arm fits beneath the spring and is secured to one of the bolts holding the spring to the axle by means of a nut 24. Obviously, other means may be used for securing the bracket to the vehicle, for example, it could be mounted on the frame. Rigidly fixed to the end of the brackets 16, 18 are a pair of parallel plates 26, 28 (Figure 7) which are tilted upwardly from the horizontal about 15°, and away from the wheel 14, as best shown in Figure 5. This slight inclination is for the purpose of directing the supporting arm 30, which is pivotally mounted on these plates, angularly toward the wheel and the ground when the arm is moved from retracted to operative position, and away from the wheel and the ground when in retracted position. The plates 26, 28 may be formed integrally with the brackets as by welding. Arm 30 is pivotally mounted between plates 26 and 28 by means of a pin 34 which is held to the plates with a nut on the underside. The arm 30 terminates at one end in a bearing 32 to which the traction device is fixed.

To facilitate rotation of the arm 30 through an arc of somewhat over 90°, as illustrated in Figure 6, I have provided an actuating bar 36 containing a slot 38 fixed at right angles to the arm 30. The actuating bar is moved by means of the pulley 48 mounted on stud 42 projecting upwardly from the pulley support 40 which may be rigidly secured at its other end to the top plate 28 by means of the bolt 34. A pin 46 is adapted to slide within the slot 38 and is fixed to the end of link 44 which pivots about the stud 42. The upper end of pin 46 extends eccentrically through the pulley 48. Thus, when pulley 48 is rotated about the stud 42 the lower end of the pin 46 which extends through the slot 38 causes the actuating arm 36 to move in the direction the pulley is turned. The pin 46 travels from the bottom of slot 38 to the top and back to the bottom as the pulley rotates (see Figure 6). The upper end of pin 46 is secured to a spring 50, the other end of which connects to the bracket 16 for biasing the pin to either extreme of the arc through which it moves. When the pulley 48 is rotated, the spring is extended until it passes over the pivot stud 42, and retracts when the pulley turns sufficiently to move the spring past this point. Thus, when the pin moves past center it is snapped into retracted or operative position, as the case may be.

The traction device consists of the hub or dished disc 52 which has its concave side facing the road. The concavity of the disc is designed to direct the feet directly between the wheel and the road. It also permits the legs to repose in a substantially horizontal plane, as pointed out below. The disc has a central bearing 53 which slides over the shaft of the L-bolt 66 for rotation. A washer and a cotter pin 65 may be provided in the end of the L-bolt 66 to hold the disc 52 in position. Extending radially from the central disc are a plurality of legs 54 made from tough rubbery material. The legs curve slightly upwardly toward their ends and terminate in feet 56. The feet are preferably arcuate in shape but their shape is not critical. It is extremely important that the legs 54 be made from a material which has some elasticity so that they will be able to withstand distortion without losing their original shape. I prefer to use molded rubber legs which are reinforced with multiple plies of fabric. A good rubber stock, such as a tread stock reinforced with rayon or nylon fabric, has proved to be highly satisfactory for this purpose. Plasticized vinyl resins and synthetic rubbers may be employed in place of rubber.

The feet 56 have gripping surfaces on both the upper and the under sides. In the form shown in the drawing I have provided a hard flexible gripping surface on the top by fixing a length of chain 58 to the foot. The chain may be secured by means of rivets, bolts or any other suitable means. On the underside of the feet I have provided cleats 60 which may be secured to the feet by means of the same bolts used for the chain 58. The cleats may take any form which provides the ability to grip an icy or snowy surface. Preferably, they should be made from a good tempered steel which has high abrasion resistance. The flexible chain 58 overlying the flexible rubber feet permits conformation to the irregular surface of the tread to insure the best possible frictional engagement between the two. I have found that if some hard irregular gripping material is not applied to the top side of the feet, snow will pack on the surface and the tread of the tire will merely slide over the top of the feet, even though the cleats are digging into the snow-covered surface of the road. Consequently, in order to insure good traction in snow it is necessary to provide some suitable gripping means on the upper surface of the feet.

The legs 54 are rather sturdy in cross section at their inner ends and taper toward the feet. The inner ends are secured to the disc 52 by means of rivets or bolts 62. In the particular form of the invention shown in the drawing I have provided eight legs, but it will be understood that the number may be varied in accordance with the size and location of the traction device with respect to the wheel.

It will be noted from Figure 5 that the plates 26, 28 comprising part of the bracket are tilted so that the retractable arm 30 moves in a diagonal direction laterally toward the wheel and downwardly toward the ground. Therefore, if the disc 52 were pivotally connected to a shaft fixed normal to the underside of arm 30, the legs 54 on the right side (as viewed in Figure 2) of the traction device would be lower than the legs on the other side, in both operable and retracted positions. It is desirable to have the disc 52 and the radial legs secured thereto in a horizontal plane when the device is retracted so as to preserve the original road clearance of the vehicle. For this reason I have provided a novel construction for securing the disc 52 to the end of the retractable arm 30. As previously explained, this connection is made by means of an L-bolt 66, the horizontal pivot leg 64 of which extends through the bearing 32. To prevent the disc from rotating about the pivot leg 64, and simultaneously to insure that the feet 56 will be fed directly into the opening between the tread and the road surface at the proper attitude, I have provided a limiting finger 68 which is also fixed to the L-bolt 66 and extends approximately parallel to the leg 64 (see Figures 3 and 4). The finger 68 bears against the top surface of the arm 30 when the device is in operative position since the forces imposed on the legs 54 tend to rotate the disc in a direction away from the arm 30. However, when the device is retracted to the position shown in Figures 1 and 3, the disc 52 may settle in horizontal position as the curved portion of the disc underlying the arm 30 moves upwardly toward the arm. When this occurs the finger 68 moves upwardly away from the arm. By this means, even though the arm 30 is disposed in the attitude shown in Figure 5 when retracted, the disc 52 and legs radiating therefrom are permitted to assume a horizontal position to maintain road clearance.

The actuating pulley 48 is equipped with a flexible cable 70 which encircles the pulley two or three revolutions and connects at its other end to the lever 86 mounted within the vehicle adjacent to the driver, as shown in Figure 1. The cable 70 is trained over pulleys 78 and 80, which in turn are supported by brackets 74 and 76, respectively, depending from the bar 72 fixed to the underside of the floorboard. The operating lever 86 is pivotally secured to bracket 84, integrally formed or welded to the bar 82, which overlies the bar 72 and may be bolted thereto. The ends of the cable are secured to openings 88 and 90 in the extensions 92 and 94 comprising the lower portion of the actuating rod.

It will be understood that other means may be employed for actuating the pulley 48. Furthermore, if desired the arm 30 may be actuated by a toggle or similar lever construction instead of the pin and pulley assembly described. The pin and pulley assembly is particularly advantageous, however, because it provides positive locking of the traction device in its retracted position.

It will be appreciated that the flexible cable 70 can be trained about a central control pulley (not shown) disposed between the two pulleys 48, one mounted near the left and one mounted near the right rear wheels. Thus, both traction devices will be operated simultaneously from the single actuating lever 86.

It is believed that the operation of the device is clear from the foregoing description. However, for purposes of clarity the operation will be reviewed briefly. When the driver of the vehicle encounters icy roads and desires to put traction under the rear wheels of the vehicle, he pushes the lever 86 forwardly, which causes the pulley 48 to turn in a counterclockwise direction about the center 42. The eccentrically mounted pin 46, the lower end of which is inserted in the slot 38, rotates the arm 30 through an arc of approximately 90° from the solid to the dotted position, as shown in Figure 6. As the arm moves from the position shown in Figure 3 to the position shown in Figure 4, it will be noted that the spring 50 will be stretched over the center of the pulley. As soon as the force applied to the actuating lever 86 moves the pulley slightly past center, the spring takes over and completes the rotation of the pulley. The supporting arm 30 moves in the direction shown by the arrow in Figure 4. The arm 30 swings diagonally toward the road and outwardly so that the center 66 of the rotating traction device assumes the position shown in Figure 2. In this position the feet 56 are adapted to rotate beneath the tread of the wheel. When the device is first placed in operative position, the legs 54 which would normally be underneath the tire tread strike the side of the tire and are pushed back. They do not become interposed between the tread and the road surface until the next revolution. The legs that are slightly above the surface of the road, however, are immediately rolled on by the advancing tire which sets the traction device in rotation. The feet 56 follow one another in series beneath the tire so that in the particular design shown, at least two feet are between the tire and the road at all times. One is entering, the second is directly beneath the tire and the third is leaving. Reference to Figure 4 will illustrate the distortion which the leg 54 must accommodate each time it passes under the tread. This is due to the fact that the hub to which the leg 54 is connected continues to move while the foot is firmly fixed to the road. By using the resilient construction described herein my device is able to withstand this distortion and recover its normal shape so that on the next revolution the foot is precisely in place for providing the friction desired.

Figure 4:
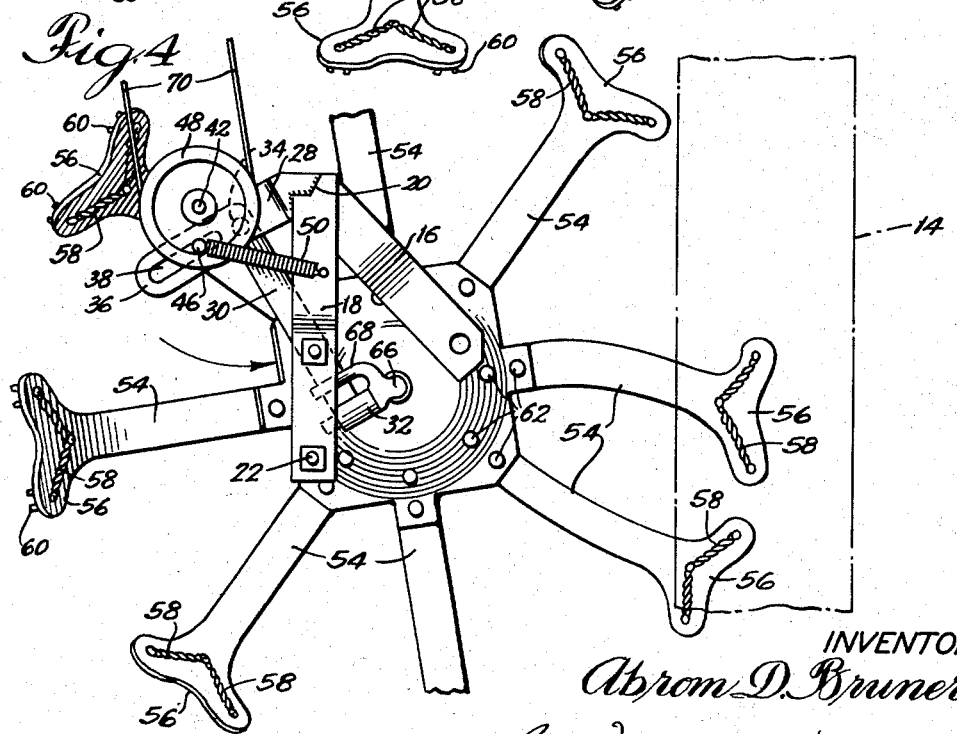
Figure 4 is a view similar to Figure 3 illustrating the device in operative position and particularly showing the distortion of the legs which occurs during operation.

When the traction devices are no longer needed, the operator of the vehicle pulls the lever 86 back, which causes the pulley 48 to be rotated in a clockwise direction, thus moving the arm 30 from the position shown in Figure 4 to the position shown in Figure 3. As soon as the pin 46 passes the center about which the pulley rotates, the spring 50 pulls it to stop position to lock the arm 30 securely in elevated position. The disc 52 rotates by gravity about the shaft 64 to a point where the top of the disc contacts the underside of the arm 30, thus lifting the legs 54 nearest the wheel so that the traction device is in horizontal position. Because the arms are made from rubber the traction devices do not rattle when the vehicle is in motion. It will be appreciated that the traction device of the invention operates in precisely the same manner whether the vehicle is moving forward or backward. Rotation of the wheel in either direction is effective to feed the arms into the bight between the tread and the road.

Other modifications of the invention will occur to those skilled in the art. It is not my intention to limit the invention to the particular forms illustrated and described herein other than as necessitated by the scope of the appended claims.

This application is a continuation-in-part of Serial No. 499,956, filed April 6, 1955, now abandoned.

What I claim as new and desire to secure by Letters Patent of the United States is:

1. An automatic traction device for a vehicle comprising a bracket fixed to the underside of said vehicle adjacent a wheel, a retractable arm pivotally mounted on said bracket for diagonal movement in a direction outwardly toward the wheel and downwardly toward the road, a rotatable hub mounted on said arm, a plurality of radially extending legs fixed to said hub, said legs being made from tough rubbery material and terminating in ground gripping feet, which legs are rotated about said hub as they pass beneath the tire of the vehicle when said arm is in operative position, means for moving said arm from operative to retracted position comprising a slotted actuating bar rigidly fixed to said arm and extending outwardly from the point about which said arm pivots, a pin adapted to slide in said slot, pulley means pivoted to said bracket about an axis parallel to the pivotal axis of said arm and having one end of said pin eccentrically mounted thereon for moving said pin through an arc to actuate said arm, and means for biasing said pulley to a locked position at either terminal point of said arc.

2. The device of claim 1 which includes additionally an operating lever in the driver's compartment of the vehicle and actuating means connecting said lever to said pulley whereby said pulley may be rotated by movement of the lever to move said arm between operative and retracted positions.

3. The device of claim 1 which includes additionally, elements duplicating those recited, adapted for providing traction for both rear wheels of said vehicle.

4. An automatic traction device for a vehicle comprising a retractable arm pivotally mounted on the underside of said vehicle adjacent one wheel and adapted to move diagonally in a direction outwardly toward the wheel and downwardly toward the road a rotatable hub mounted on said arm and having a plurality of radially extending legs fixed thereto, said legs being made from tough rubbery material and terminating in ground gripping feet for interposition between the tread of the wheel and the ground which legs are rotated about said hub as they pass beneath the tire of the vehicle when said arm is in operative position, said retractable arm terminating in a bearing axially inclined from the horizontal toward the road, an L-shaped shaft having one leg inserted in said bearing, the other leg extending downwardly toward the road to provide a central pivot on which said hub is rotatably mounted, a finger rigidly fixed to said shaft at the apex of the "L" and adapted to bear against the top of said arm to resist tilting of said hub when the arm is in operative position and to move away from said arm to permit said hub to assume a horizontal position when the arm is retracted.

References Cited in the file of this patent

UNITED STATES PATENTS

| | | |
|---|---|---|
| 1,374,252 | Thorne et al. | Apr. 12, 1921 |
| 1,403,270 | Small | Jan. 10, 1922 |
| 2,140,606 | Stickles | Dec. 20, 1938 |
| 2,277,036 | Chaussee | Mar. 24, 1942 |
| 2,747,691 | Lakey et al. | May 29, 1956 |
| 2,790,514 | Robinson | Apr. 30, 1957 |